(12) United States Patent
Zander et al.

(10) Patent No.: US 6,659,166 B1
(45) Date of Patent: Dec. 9, 2003

(54) INSTALLATION FOR CONTROLLING THE SEALED CONDITION OF WATER-GAS HEAT EXCHANGERS FOR INDUSTRIAL FURNACES

(75) Inventors: Gilles Zander, Foch (FR); André Gaggioli, Naizieres les Metz (FR)

(73) Assignee: Usinor, Puteaux (FR)

( * ) Notice: Subject to any disclaimer, the term of this patent is extended or adjusted under 35 U.S.C. 154(b) by 63 days.

(21) Appl. No.: 09/830,292
(22) PCT Filed: Sep. 6, 2000
(86) PCT No.: PCT/FR00/02444
§ 371 (c)(1),
(2), (4) Date: Apr. 25, 2001
(87) PCT Pub. No.: WO01/18261
PCT Pub. Date: Mar. 15, 2001

(30) Foreign Application Priority Data

Sep. 9, 1999 (FR) .............................................. 99 11258

(51) Int. Cl.[7] .............................. F24H 3/00; F27D 21/00
(52) U.S. Cl. ......................... 165/11.1; 165/47; 432/32; 431/12
(58) Field of Search .......................... 165/11.1; 266/44; 431/12; 432/36, 37; 73/40

(56) References Cited

U.S. PATENT DOCUMENTS

| | | | |
|---|---|---|---|
| 4,492,560 A | * | 1/1985 | Sundberg .................... 431/12 |
| 4,815,965 A | * | 3/1989 | Likins, Jr. .................... 431/12 |
| 4,876,889 A | * | 10/1989 | Shakkottai et al. |
| 5,137,586 A | | 8/1992 | Klink |
| 5,387,273 A | * | 2/1995 | Hartman et al. |
| 5,535,253 A | | 7/1996 | Loisy et al. |

FOREIGN PATENT DOCUMENTS

| | | |
|---|---|---|
| DE | 38809516 A1 | 10/1989 |
| WO | WO 01/18261 A1 | 3/2001 |

* cited by examiner

*Primary Examiner*—Ljiljana Ciric
(74) *Attorney, Agent, or Firm*—Sughrue Mion, PLLC

(57) ABSTRACT

An industrial furnace has at least one assembly formed by an extruder for extracting hot gas present in a given zone of the furnace, a water/gas heat exchanger for cooling the hot gas, and a reinjecting device for reinjecting the cooled gas into a zone of the furnace situated downstream from the zone from which the hot gas was extracted. First and second sampling devices sample the hot gas at points each situated upstream and downstream from a heat exchanger and two-port valves allowing the sampling to be performed. A regulating device regulates the respective pressures of the hot gas and the cooled gas downstream from the sampling devices. A three-port valve selects the hot gas or the cooled gas and applies it to a hygrometer. An operator is informed of the results of analyses performed by the hygrometer so that the operator may compare the degree of humidity of the hot gas and of the cooled gas for each of the heat exchangers.

14 Claims, 1 Drawing Sheet

Figure 1:
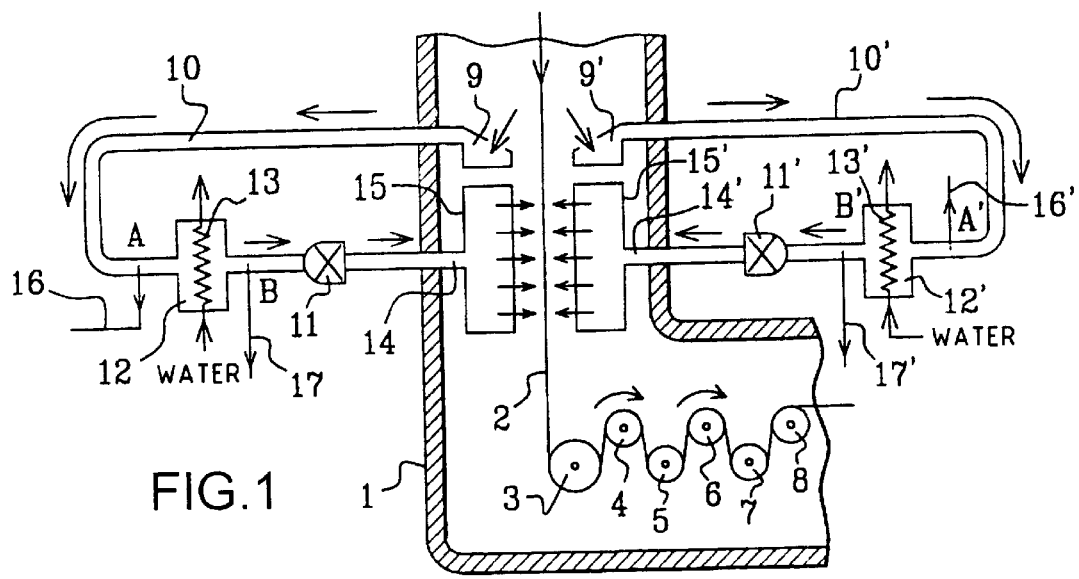

INSTALLATION FOR CONTROLLING THE SEALED CONDITION OF WATER-GAS HEAT EXCHANGERS FOR INDUSTRIAL FURNACES

The invention relates to industrial furnaces providing heat treatment on a variety of articles, such as metal pieces, and in particular travelling strip metal. More precisely, the invention relates to leak testing water/gas heat exchangers used for cooling the atmosphere inside such furnaces in zones where such cooling is necessary.

As a general rule, steel strip is coated by being dipped in initially liquid zinc (galvanization) in an installation designed to galvanize travelling strip material on a continuous basis. Such an installation comprises firstly an annealing furnace in which the strip is successively heated and cooled. On leaving this furnace, the strip passes into a "bell", which is a tubular piece connected to the furnace and having a bottom end through which the strip leaves to plunge into the bath of liquid zinc. The function of the bell is to isolate the travelling strip from the outside atmosphere between leaving the annealing furnace and entering the bath of zinc. The strip is then extracted vertically from the bath of zinc, at which stage it has a coating of zinc on both faces to a thickness which is subsequently equalized by passing between rollers.

Passing the strip through the annealing furnace is an essential step for obtaining high quality galvanization. It is essential to maintain a non-oxidizing atmosphere in the annealing furnace so that no scale forms on the surface of the steel strip. If any such scale were to form it would have disastrous consequences for the adhesion of the zinc deposit on the surface of the strip. To this end, the atmosphere throughout the inside of the furnace is constrained to comprise mostly nitrogen, while also containing about 2% hydrogen or even more for reacting with any traces of oxygen that might be present. That is why the gas constituting this atmosphere is conventionally referred to as "$HN_x$".

The annealing furnace is made up of a plurality of successive zones that are not sealed from one another and in which different temperatures are imposed, initially increasing and subsequently decreasing, and in particular:

a zone in which the strip is preheated;

a heating zone in which the strip reaches its maximum temperature;

a slow cooling zone; and a fast cooling zone.

Furnaces for continuously annealing steel strip that are not located at the head of a galvanizing line can also operate on the same principle, terminating in one or more cooling zones.

In the preheating and heating zones, the desired temperature is obtained by injecting $HN_x$ that has been preheated to the desired temperature. This $HN_x$ then passes through the cooling zones where it must itself be cooled so as to perform its function. For this purpose, the cooling zones of the furnace include a succession of devices placed in register with each of the two faces of the strip for the purpose of extracting a fraction of the gas present in the zone of the furnace through which the strip is passing, then passing the gas through a heat exchanger and reinjecting the cooled gas back into the furnace, in the vicinity of the strip and downstream from the preceding extraction zone so as to enable the strip to be cooled over a fraction of its path. The heat exchangers which cool the extracted gas are conventionally constituted by copper coils having cold water circulating therein, with the gas to be cooled flowing around the coils. These coils are therefore subjected to large-amplitude thermocycling which damages them over time. In particular, regions of brazing constitute weak points where cracks are particularly likely to occur quite quickly. The consequence of such cracks is that the cooling water escapes from the coil and comes into contact with the gas to be cooled. It vaporizes and is injected back into the furnace together with the gas, thereby moistening the atmosphere in the furnace. When the water vapor content of the atmosphere becomes too high because of these leaks, the surface of the metal oxidizes, and as a result galvanization takes place poorly. Under such circumstances, it is necessary to replace the heat exchangers periodically. However, since such an operation requires the annealing furnace to be stopped for a long time (24 hours are needed to replace one heat exchanger), it must be performed only when absolutely necessary, since otherwise the productivity of the installation will be excessively compromised.

To determine when it is necessary to replace a heat exchanger, it is common practice to monitor the quality of the atmosphere in the furnace in each of its zones by periodically measuring its moisture content by determining its dew point. Typically, the dew point of a dry $HN_x$ atmosphere is −30° C. to −40° C. It is measured with a hygrometer, generally of the capacitive type. When a heat exchanger has a microcrack delivering about 0.1 liters per hour (1/h) of water into the atmosphere of the furnace, the dew point is lowered by about 0.6° C. around −40° C. Detecting such a small quantity of moisture is not within the ability of conventional hygrometers, even though such a small quantity is already sufficient to damage the surface of the strip. Ordinary measuring devices can be used only to detect the existence of relatively large leaks of water (about 0.2 l/h, which lowers the dew point of $HN_x$ by 1° C. at around −35° C.), even though such a leak can already have damaged a significant length of strip during earlier stages while the water content was building up. In addition, conventional devices do not make it possible to determine which heat exchanger is faulty. When a significant drop in the dew point is detected, it is therefore necessary to stop the annealing installation (and also the galvanization installation following it, if there is one) and to inspect the heat exchangers one by one, e.g. by increasing the pressure of the water circulating therein. That method is not suitable for detecting microcracks reliably, and in addition it accelerates damage to faulty brazing that has not yet become cracked through.

The object of the invention is to provide the users of furnaces that include water/gas heat exchangers for cooling the atmosphere thereof with a device for leak testing such heat exchangers that is suitable for detecting leaks at an early stage of development, while also identifying which heat exchanger is faulty.

To this end, the invention provides an installation for leak testing water/gas heat exchangers fitted to an industrial furnace, said furnace having at least one assembly formed by means for extracting hot gas present in a given zone of said furnace, a water/gas heat exchanger for cooling said hot gas, and means for reinjecting said cooled hot gas into a zone of said furnace situated downstream from said zone from which said hot gas was extracted, the installation being characterized in that it comprises:

means for sampling said hot gas at points each situated upstream from a heat exchanger and two-port valves allowing said sampling to be performed;

means for sampling said cooled hot gas at points each situated downstream from a heat exchanger and two-port valves allowing said sampling to be performed;

means for regulating the respective pressures of said hot gas and said cooled gas downstream from said sampling means;

means such as a three-port valve and its outlet pipe for selecting said hot gas or said cooled gas and applying it to a hygrometer; and means for informing an operator of the results of analyses performed by the hygrometer and enabling the operator to compare the degree of humidity of said hot gas and of said cooled gas for each of the heat exchangers.

As will have been understood, the invention relies on the principle of differential measurement of the dew point upstream and downstream from each heat exchanger. Such a measurement requires a high sensitivity hygrometer to be used that is capable of detecting differences of about 0.3° C. between dew points at around −35° C. For this purpose, it is preferable to use an infrared absorption hygrometer.

Figure 2:
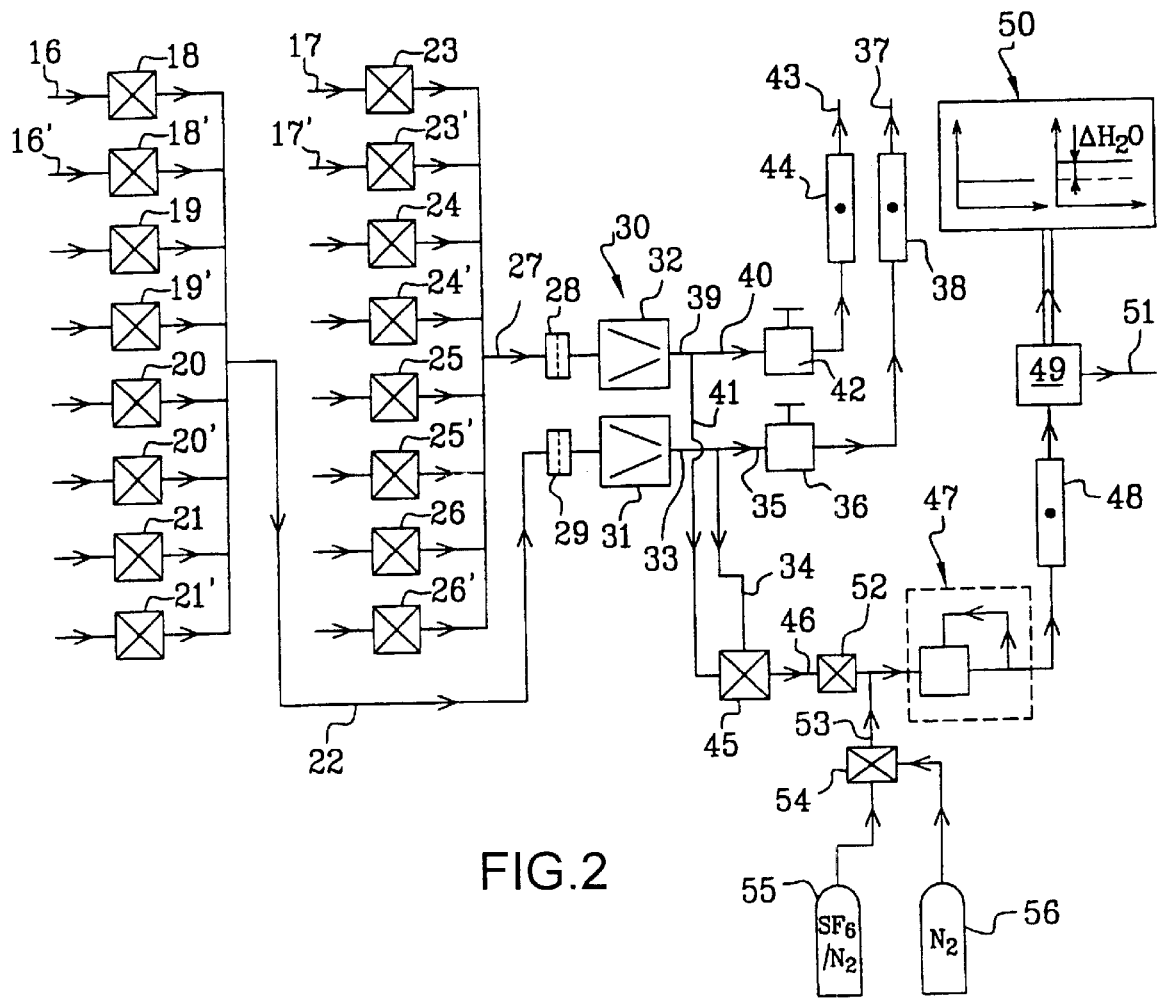

The invention will be better understood on reading the following description given with reference to the following accompanying figures:

FIG. 1 is a diagram of a portion of a furnace having a strip running therethrough, such as an annealing furnace, and the installation for cooling the gas present in said portion, which installation comprises water/gas heat exchangers; and FIG. 2 is a diagram of an installation of the invention for leak testing water/gas heat exchangers.

In FIG. 1, the portion of the annealing furnace 1 shown has a steel strip 2 running therethrough which passes over rollers 3, 4, 5, 6, 7, and 8. In this portion of the furnace 1, it is desired to cool the atmosphere surrounding the strip 2 so as to cool the strip 2 itself. This atmosphere can be a mixture of nitrogen and hydrogen ($HN_x$), or any other atmosphere that is normally dry and that is suitable for performing some specific metallurgical treatment on the strip 2 in the furnace 1. For this purpose, the portion of the furnace 1 that is shown is fitted with two identical devices, which are placed on either side of the strip 2, so as to obtain an identical cooling effect on both faces of the strip 2. Each of these devices comprises:

means for extracting hot gases at a temperature $\theta_1$ entering the portion shown on the furnace 1, constituted in this case by a collector 9, 9' connected by a pipe 10, 10' to a fan 11, 11';

a heat exchanger 12, 12' inserted in the pipe 10, 10' between the collector 9, 9' and the fan 11, 11'; in this heat exchanger 12, 12', the hot gas is cooled to a temperature $\theta_2$ by a coil 13, 13' carrying an internal flow of water; and means for returning the cooled gas into the furnace 1 in the vicinity of the strip 2 and comprising a pipe 14, 14' passing through the wall of the furnace 1 and a diffuser 15, 15' that spreads out the cooled gas over a large fraction of the surface of the strip 2.

Thus, the cooled gas contributes to cooling the strip 2, mainly facing the diffusers 15, 15', but also in the remainder of the portion of the furnace 1 that is shown. More generally, each cooling zone of the furnace 1 has a plurality of pairs of such cooling devices, and the number and the cooling powers thereof vary as a function of the desired results. For all of the elements described above, the installation does not differ from the known prior art.

In accordance with the invention, at a point A situated upstream from the heat exchanger 12 on the path of the gas sucked through by the fan 11 and passing along the pipe 10, there is installed a pipe 16 for taking a fraction of said gas. Similarly, at a point B situated downstream from said heat exchanger 12 on the pipe 14 delivering the cooled gas back to the furnace 1, there is installed another pipe 17 for taking a fraction of said gas. The points A and B and the pipes 16 and 17 have their equivalents A', B', 16', 17' on the gas cooling device that is symmetrical to the above device about the strip 2, and the same applies for all similar devices installed in the furnace 1. The gas extracted in this way is applied to an installation whose preferred configuration is shown diagrammatically in FIG. 2.

In FIG. 2, it is assumed that the entire furnace 1 is fitted with four devices of the type shown in FIG. 1, and that there are therefore eight heat exchangers in all identical to the heat exchangers 12 and 12', all of which need to be leak tested. Naturally, the number of devices is merely by way of example and is not limiting, and the invention can be implemented even when the furnace 1 has only a single water/gas heat exchanger.

The pipes 16, 16' and their equivalents (not given references in FIG. 2) from the other heat exchangers that take hot gas from points A, A' upstream from the heat exchangers 12, 12' open out via respective two-port solenoid valves 18–21 and 18'–21' which respond to an operator (or to an automatic device controlling operation of the installation) to allow or prevent gas circulation in the remainder of the corresponding pipe, and thus serve to allow samples to be taken. Downstream from said solenoid valves 18–21, 18'–21', the pipes 16, 16' and their equivalents are united to form a single pipe 22. Similarly, the pipes 17, 17' and their equivalents for the other heat exchangers which take samples of cooled gas from the points B, B' downstream from the heat exchangers 12, 12' open out via respective two-port solenoid valves 23–26, 23'–26' that respond to the operator (or to the automatic device for controlling operation of the installation) to allow or prevent gas circulation downstream from the corresponding pipe. Downstream from said solenoid valves 23–26, 23'–26', the pipes 17, 17' and their equivalents are united to form a single pipe 27. Filters 28, 29 are preferably installed on the pipes 22, 27 so as to remove any impurities from the gas travelling therealong, since impurities might disturb the operation of the following members. In a leak testing installation based on the annealing furnace of a galvanization line, these filters must be capable in particular of stopping zinc particles and vapor that might be contained in the gas, due to such vapor rising from the galvanization bath into the furnace via the bell, with this effect being difficult to avoid in practice. Sintered bronze pellets having a pore size of about 1 micron ($\mu$m) are well adapted to this purpose. Naturally, the filters 28, 29 could be replaced by other filters situated further upstream, i.e. in each of the pipes 16, 16', 17, 17' and their equivalents, or in addition to such filters.

Downstream from the filters 28, 29, each of the pipes 22, 27 is connected to a pump which controls the suction of gas samples taken either upstream or downstream from the heat exchangers 12, 12' and their equivalents. In the example shown in FIG. 2, a single two-body pump 30 is used. The first body 31 is connected to the pipe 22 and thus sucks in hot gas taken from points A, A' and their equivalents at the inlets to the heat exchangers 12, 12' and their equivalents. The second body 32 is connected to the pipe 27 and thus sucks in cooled gas taken from the points B, B' and their equivalents at the outlets from the heat exchangers 12, 12' and their equivalents. Naturally, it would remain within the spirit of the invention to use two pumps that are entirely separate from each other instead of such a two-body pump 30.

At the outlet from the first body 31 of the pump 30, there is connected a pipe 33 which itself is subdivided into two pipes 34 and 35. The pipe 35 is connected to an dumper 36 whose function is to exhaust to the atmosphere a determined fraction that is adjustable on demand of the gas sucked in by the first body 32 of the pump 30 and present in the pipe 33. This exhaust takes place via a pipe 37 having a rotameter 38 installed therein for monitoring the flow rate of the exhausted gas. The gas which does not pass through the dumper 36 follows its path along the pipe 34 at a pressure which can be kept constant regardless of variations in gas pressure at the outlet from the first body 31 of the pump 30 by adjusting the operating parameters of the dumper 36. Maintaining this pressure constant makes it possible to obtain greater reliability in operation for the installation as a whole, and in particular for its "analysis" portion as described below. Similarly, at the outlet from the second body 32 of the pump 30, there is connected a pipe 39 which is itself subdivided into two pipes 40 and 41. The pipe 40 is connected to a dumper 42 whose function is to exhaust to the atmosphere a determined fraction that is adjustable on demand of the gas sucked in via the second body 32 of the pump 30 and present in the pipe 39. This exhaust takes place via a pipe 43 having a rotameter 44 installed therein for monitoring the flow rate of the exhausted gas. The gas which does not pass through the dumper 42 continues to travel along the pipe 41 at a pressure that is kept constant regardless of variations in the pressure of the gas output by the second body 32 of the pump 30 by adjusting the operating parameters of the dumper 42. The rotameters 38 and 44 can be provided with respective alarms that indicate if the flow rate of gas passing through them becomes too low. When such an alarm is triggered that means that too small quantity of gas is flowing through the installation, e.g. because the filters 28 and 29 are becoming clogged and need to be cleaned or replaced. In practice, if each body 31, 32 of the pump 30 operating under normal conditions sucks in gas at a rate of 500 l/h, then about 100 l/h are delivered by each of the bodies 31 and 32 to the "analysis" portion of the installation, with the remainder of the gas being delivered to the atmosphere via the dumpers 36, 42.

The pipe 34 which thus carries hot gas for analysis, and the pipe 41 which thus carries cold gas for analysis, are connected to two respective inlets of a three-port solenoid valve 45. A pipe 46 is connected to the output of the solenoid valve 45 whose function is therefore to select hot or cold gas for application to the remainder of the installation for analysis (and any other device performing this function could naturally replace the three-port solenoid valve 45). Thereafter, the gas is preferably passed through a flow rate regulator 47 that enables said gas to be delivered at a constant flow rate into the remainder of the installation. This flow rate is measured by a rotameter 48, for example.

The hygrometer 49 is installed at the outlet from the rotameter 48 and serves to determine the dew point of the gas applied thereto. It is fitted with means 50 for giving the results of its analyses to the operator, and with an outlet pipe 51 for exhausting gas into the atmosphere after it has been analyzed. Measuring the dew point gives indirect access to the water vapor content of the analyzed gas.

In order to be able to perform differential measurement of the dew points of gas taken upstream and downstream of passage through a heat exchanger 12, 12', and in order to do so with satisfactory accuracy, the hygrometer 50 must have sensitivity that is better than that of a conventional capacitive hygrometer. It must be capable of detecting dew point differences of less than 0.5° C. at around −30° C. to −40° C., where such differences correspond to the gas already having sufficient moisture content to damage the surface quality of the strip 2. Hygrometer response time must also be as fast as possible. From all these points of view, infrared hygrometers are very suitable. They have high sensitivity enabling them to detect differences of 0.3° C. or even less between gas dew points in the intended temperature range, and their response time is less than 20 seconds (s) under the same conditions. Furthermore, for an application to annealing furnaces integrated in a galvanization line, such hygrometers have the advantage of being relatively insensitive to the residual presence of zinc vapor in the gas under analysis. In this respect they are more advantageous than mirror hygrometers which provide good sensitivity but whose operation would quickly become disturbed by the presence of zinc vapor condensing on the mirror. Mirror hygrometers are also poorly suited to measuring dew points as low as those in $HN_x$ mixtures since their mirrors cannot be cooled with enough efficiency. That said, for applications other than monitoring moisture content in $HN_x$ from annealing furnaces prior to galvanization and in which the above-mentioned problems (or similar problems) do not arise, the use of a mirror hygrometer could be envisaged. Similarly, for an application to annealing furnaces integrated in a galvanization line, any other type of hygrometer (not an infrared hygrometer) giving the same performance and the same ease of use would be suitable.

The installation of the installation is used as follows.

Initially, it is necessary to calibrate the hygrometer 50. Calibration can be performed using an independent installation, but it is advantageous to integrate calibration means in the leak testing installation itself, as shown in FIG. 2. For this purpose, the pipe 46 interconnecting the outlet of the three-port solenoid valve 45 and the flow rate regulator 47 receives a two-port solenoid valve 52 which makes it possible to interrupt at will the flow of gas coming from the furnace 1. Downstream from the solenoid valve 52, the pipe 46 is connected to a pipe 53 enabling a calibration gas to be injected to replace the gas coming from the furnace. The admission of calibration gas into the pipe 53 is controlled by a three-port solenoid valve 54 connected to cylinders 55, 56 containing the two calibration gases that are to be used. In the example shown, these gases are firstly pure nitrogen and secondly one or more mixtures of nitrogen and a known fraction of water vapor, or of a gas such as sulfur hexafluoride $SF_6$ whose absorption band in the infrared is known to be close to that of water vapor. The advantages of using an $N_2$—$SF_6$ mixture instead of an $N_2$—$H_2O$ mixture are that $N_2$—$H_2O$ mixtures are relatively unstable over time and it is not possible to fill cylinders of such mixtures to high pressure without causing the water vapor to condense (e.g. when the water content is 400 parts per million (ppm), the maximum tolerable pressure is 11 bars). Cylinders containing $N_2$—$H_2O$ mixtures are necessarily of small capacity so their lifetime in use is limited, which makes them unsuited for use under industrial conditions. From this point of view, cylinders containing $N_2$—$SF_6$ mixtures are much better since this mixture can accept very high pressures, is stable over time, and costs very little more than an industrially prepared $N_2$—$H_2O$ mixture By initially performing calibration with $N_2$—$H_2O$ mixtures to determine the correspondence between the $SF_6$ content of a calibration gas and the output signal supplied by the hygrometer, and the water vapor content that corresponds to the same output signal, it is possible to calibrate an infrared hygrometer 49 on $N_2$—$SF_6$ mixtures before preforming any run of measurements on the humidity of the atmosphere in a furnace. For this calibration, the valve 52 is closed and the valve 54 is opened so as to allow a selected one of the calibration gases contained in the cylinders 55, 56 to penetrate into the pipes 53 and 46. Naturally, it is possible to use a larger number of calibration gases, and to modify the installation accordingly. Once the hygrometer 49 has been calibrated, the valve 54 is closed and the valve 52 is opened, and it is possible to begin analyzing gas coming from the furnace 1.

Initially, the humidities of the gas samples taken upstream and downstream of a first heat exchanger, e.g. the heat exchanger 12, are compared. For this purpose, the valves 18 and 23 are opened while all of the other valves 19–21, 18'–21', 24–26, 23'–26' are closed and both bodies of the pump 30 are put into operation simultaneously. The first body 31 of the pump 30 thus delivers hot gas to the three-port valve 45 via the pipe 34, while the second body 32 of the pump 30 delivers cooled gas towards the same valve 45 via the pipe 41. In an initial analysis step, the valve 45 is opened so as to admit only hot gas from the pipe 34 into its outlet pipe 46, and said hot gas is thus applied to the hygrometer 49 for a length of time that is sufficient to determine its dew point, from which its water vapor content is deduced. Once this period of time has elapsed, the valve 45 is actuated so as to admit into its outlet pipe 46 only the cooled gas coming from the pipe 41, and this is in turn applied to the hygrometer 49. The results of analyzing the hot gas and the cooled gas are then given to the operator by the means 50, so as to make it possible to perform an immediate comparison between the respective dew points of the hot gas as taken from the furnace and of the same gas when cooled after passing through the heat exchanger 12. From this comparison of dew points, it is possible to deduce the value $\Delta H_2O$ representing the difference in water vapor content for the hot gas and the cooled gas. If this value is zero or very small (for example if it gives rise to a difference of less than 0.5° C. on the respective dew points of the gas samples), then it can be concluded that the heat exchanger 12 is still sufficiently leakproof and does not need to be replaced. If $\Delta H_2O$ is large, that means that this heat exchanger is leaky and it needs to be replaced in order to avoid degrading the quality of the atmosphere in the furnace 1.

Once this result has been obtained, the valves 18 and 23 are closed and the valves 18' and 23' are opened so as to perform the same leak testing operation as before but on the heat exchanger 12'. The operation is then repeated in similar manner for each of the other heat exchangers of the installation by closing and opening the appropriate valves. A run of heat exchanger leak tests as described above is performed while the furnace is in operation without requiring it to be stopped, and this can be done at a periodicity that is selected by the operator. The various operations of opening and closing the valves can be performed manually, and the gas moisture contents before and after passage through a given heat exchanger can be compared by the operator looking at the results given by the means 50. However, fully automatic operation of the installation can also be envisaged. Under such circumstances, where appropriate, an alarm can be triggered indicating that a given heat exchanger is faulty. The possibility of performing very fine detection not only of whether a heat exchanger is leaking and if so by how much, but also of which particular heat exchanger is involved constitutes a major advantage of the installation compared with those previously known in that it makes it possible to save a great deal of time in repair operations. Furthermore, this avoids any need temporarily to increase the pressure of the water flowing in the heat exchangers in order to attempt to detect microleaks, which operation runs the risk of accelerating damage to brazed joints, as mentioned above.

If it is found during analysis that the humidity of hot gas taken from upstream of one or more of the heat exchangers is already abnormally high but that it does not increase when the gas passes through said heat exchanger(s), then it can be deduced that water is penetrating into the furnace due to damage to cooled members of the installation other than the heat exchangers (e.g. the bearings of the rollers 3–8, or the pyrometer sighting tubes for measuring the temperature inside the furnace). This humidity could also be due to ingress of air leading to an abnormally high quantity of oxygen reacting with the hydrogen in the $HN_x$. The multiplicity of points from which hot gases are taken (one per heat exchanger) can make it much easier to locate the fault.

A particularly advantageous characteristic of the invention as described above and shown in the drawings lies in the use of a two-body pump 30 (or of two separate pumps that operate simultaneously), followed by a three-port solenoid valve 45 controlling admission of hot gas or cooled gas into the hygrometer 49. It might be possible to envisage using a single body pump and placing the valve 45 upstream from the pump. However the disposition used in the invention has the advantage of making it possible to switch over as quickly as possible between analyzing a hot gas sample and analyzing a cooled gas sample for a given heat exchanger, and such speed is of great importance when performing differential measurement of the humidity of the samples.

The materials used for the various members of the installation must be compatible with the properties of the gases they are to carry, which gases can be corrosive at the temperatures encountered, particularly if they are carrying moisture. In particular, it is recommended to use metals such as stainless steel for making the pump body 30 and plastics materials such as PTFE for the diaphragms of the pump 30 and of the flow rate regulator 47. The various pipes can be made of copper or of stainless steel, for example, and their inside walls can be polished or coated in a material such as molten silica so as to prevent water vapor adhering thereto, since that would spoil the results of the analyses.

Naturally, the various types of solenoid valve mentioned in the above description could be replaced by manually-controlled valves (or any other devices) performing the same functions of allowing such and such a gas to flow or preventing it from flowing in the various portions of the installation. Solenoid valves have the clear advantage of being suitable for remote control either by an operator or by an automatic device for controlling the installation.

Air inlets into the sampling and measuring installation must be avoided. To this end, it is recommended, even when the installation is not being used for analysis purposes, to maintain a permanent flow therethrough of gas extracted from the furnace, and this also has the advantage of reducing the number and magnitude of the thermal shocks to which the installation is subjected.

If a given industrial site has a plurality of furnaces on which it is possible to envisage using a leak testing installation of the invention, it is also possible to envisage designing a moving installation comprising the set of members described above as from the filters 28, 29 or the pump 30. Each furnace would then be permanently fitted with appropriate valves and pipes as far as the pipes 22, 27 inclusive, and these could then be connected to the moving installation each time it is found necessary to leak test the heat exchangers of said furnace. The hygrometer 49, the pump 30, etc. need be provided on any given site once only.

The invention is applicable to leak testing any installation that includes water/gas heat exchangers for lowering the temperature of a gas constituting the atmosphere in a furnace, the above-described annealing furnace being merely an example in which it is particularly advantageous to use the invention.

What is claimed is:

1. An installation for leak testing water/gas heat exchangers fitted to an industrial furnace, said furnace having at least one assembly formed by means for extracting hot gas present in a given zone of said furnace, a water/gas heat exchanger for cooling said hot gas, and a reinjecting device for reinjecting said cooled gas into a zone of said furnace situated downstream from said zone from which said hot gas was extracted, the installation, comprising:

a first sampling device for sampling said hot gas at a first plurality of points each situated upstream from a heat exchanger and two-port valves allowing said sampling to be performed;

a second sampling device for sampling said cooled gas at a second plurality of points each situated downstream from a heat exchanger and two-port valves allowing said sampling to be performed;

a regulating device for regulating the respective pressures of said hot gas and said cooled gas downstream from said sampling devices;

a three-port valve for selecting said hot gas or said cooled gas and applying the selected gas to a hygrometer; and a device for informing an operator of the results of an analyses performed by the hygrometer and for enabling the operator to compare the degree of humidity of said hot gas and of said cooled gas for each of the heat exchangers.

2. The installation according to claim 1, further comprising a flow rate regulator for regulating the flow rate of gas reaching the hygrometer and situated on the outlet pipe from the three-port valve.

3. The installation according to claim 2, further comprising two-port valves that enable the hygrometer to be calibrated before performing a series of measurements.

4. The installation according to claim 2, wherein said sampling devices included either a two-body pump or two independent pumps, said pump(s) being situated upstream from said three-port valve.

5. The installation according to claim 2, wherein the hygrometer is an infrared hygrometer.

6. The installation according to claim 1, further comprising two-port valves that enable the hygrometer to be calibrated before performing a series of measurements.

7. The installation according to claim 6, wherein said two-port valves enabling the hygrometer to be calibrated include at least one container of a mixture of nitrogen and sulfur hexafluoride.

8. The installation according to claim 7, wherein said sampling devices include either a two-body pump or two independent pumps, said pump(s) being situated upstream from said three-port valve.

9. The installation according to claim 7, wherein the hygrometer is an infrared hygrometer.

10. The installation according to claim 6, wherein said sampling devices include either a two-body pump or two independent pumps, said pump(s) being situated upstream from said three-port valve.

11. The installation according to claim 6, wherein the hygrometer is an infrared hygrometer.

12. The installation according to claim 1, wherein said sampling devices include either a two-body pump or two independent pumps, said pump(s) being situated upstream from said three-port valve.

13. The installation according to claim 12, wherein the hygrometer is an infrared hygrometer.

14. The installation according to claim 1, wherein the hygrometer is an infrared hygrometer.

* * * * *